US010922079B2

(12) United States Patent
Gopal et al.

(10) Patent No.: US 10,922,079 B2
(45) Date of Patent: Feb. 16, 2021

(54) METHOD AND APPARATUS TO EFFICIENTLY PERFORM FILTER OPERATIONS FOR AN IN-MEMORY RELATIONAL DATABASE

(71) Applicant: Intel Corporation, Santa Clara, CA (US)

(72) Inventors: Vinodh Gopal, Westborough, MA (US); Kirk S. Yap, Westborough, MA (US); James Guilford, Northborough, MA (US); Simon N. Peffers, Acton, MA (US)

(73) Assignee: Intel Corporation, Santa Clara, CA (US)

( * ) Notice: Subject to any disclaimer, the term of this patent is extended or adjusted under 35 U.S.C. 154(b) by 294 days.

(21) Appl. No.: 15/856,245

(22) Filed: Dec. 28, 2017

(65) Prior Publication Data

US 2019/0034493 A1    Jan. 31, 2019

(51) Int. Cl.
*G06F 9/00*      (2006.01)
*G06F 9/30*      (2018.01)
*G06F 16/2455*   (2019.01)
*G06F 16/2453*   (2019.01)
*G06F 16/245*    (2019.01)

(52) U.S. Cl.
CPC ...... *G06F 9/30036* (2013.01); *G06F 16/2453* (2019.01); *G06F 16/24561* (2019.01); *G06F 16/24569* (2019.01)

(58) Field of Classification Search
CPC .......... G06F 16/2453; G06F 16/24569; G06F 16/2455
See application file for complete search history.

(56) References Cited

U.S. PATENT DOCUMENTS

| 2013/0151567 A1* | 6/2013 | Ellison | G06F 9/3887 |
| | | | 707/802 |
| 2013/0151568 A1* | 6/2013 | Ellison | G06F 16/284 |
| | | | 707/802 |
| 2013/0262776 A1* | 10/2013 | Asaro | G06F 12/0848 |
| | | | 711/135 |
| 2014/0280283 A1* | 9/2014 | Li | G06F 16/24532 |
| | | | 707/764 |
| 2018/0052708 A1* | 2/2018 | Ganesan | G06F 9/485 |
| 2018/0074792 A1* | 3/2018 | Goergens | G06F 16/221 |
| 2018/0074821 A1* | 3/2018 | Goergens | G06F 9/30036 |
| 2018/0095750 A1* | 4/2018 | Drysdale | G06F 9/5038 |

OTHER PUBLICATIONS

Oracle, "Softwate in Silicon in the Oracle SPARC M7 Processor" Copyright 2016, 31 pages. https://hotchips.org/wp-content/uploads/hc_archives/hc28/HC28.23-Tuesday-Epub/HC28.23.80-Big-Data-Epub/HC28.23.821-SPARC-M7-Aingaran-Oracle-v9.pdf.
U.S. Appl. No. 15/719,774, filed Sep. 29, 2017, 45 pages.
(Continued)

*Primary Examiner* — Thu Nguyet T Le
(74) *Attorney, Agent, or Firm* — Compass IP Law, PC

(57) ABSTRACT

Data element filter logic ("hardware accelerator") in a processor that offloads computation for an in-memory database select/extract operation from a Central Processing Unit (CPU) core in the processor is provided. The Data element filter logic provides a balanced performance across an entire range of widths (number of bits) of data elements in a column-oriented Database Management System.

17 Claims, 10 Drawing Sheets

(56) References Cited

OTHER PUBLICATIONS

Extended European Search Report for Patent Application No. 18208995.3, dated Mar. 28, 2019, 32 pages.
Thomas Willhalm et al: "SIMD-scan: Ultra Fast in-Memory Table Scan using on-Chip Vector Processing Units", Proceedings of the VLDB Endowment; [ACM Digital Library], Assoc. of Computing Machinery, New York, NY, vol. 2, No. 1, Aug. 28, 2009 (Aug. 28, 2009), pp. 385-394, XP058332760, ISSN: 2150-8097, DOI: 10.14778/1687627.1687671.

* cited by examiner

METHOD AND APPARATUS TO EFFICIENTLY PERFORM FILTER OPERATIONS FOR AN IN-MEMORY RELATIONAL DATABASE

FIELD

This disclosure relates to databases and in particular to efficiently performing filtering operations in-memory databases.

BACKGROUND

A database is an organized collection of data. A relational database is a collection of tables, queries, and other elements. A database-management system (DBMS) is a computer software application that interacts with other computer software applications and the database to capture and analyze data.

Structured Query Language (SQL) is the language typically used by relational database management systems (RDBMS) to access and manipulate data. SQL performs data definition, data manipulation (for example, insert data, update data, delete data) and query (for example, search for data). SQL is an American National Standards Institute (ANSI) and International Organization for Standardization (ISO) standard.

In contrast to a traditional database system that stores data on a storage device, for example, a hard disk drive (HDD) or a solid state drive (SSD), an in-memory database (IMDB) system is a database management system that stores data in system memory. An IMDB provides extremely high queries/second to support rapid decision making based on real-time analytics.

A column-oriented DBMS is a DBMS that stores data elements (data values) in tables by column rather than by row. By storing data elements in columns rather than rows, the database can more precisely access the data elements that it needs to answer a query rather than scanning and discarding unwanted data elements in rows in the table. Each column in the table is viewed as an array of unsigned integers of arbitrary bit-width (for example from 1-32 bits), for example, a column of data elements for states (50) in the United States can be represented as an array of 6-bit data elements (a dictionary encoded efficient representation since the cardinality of the states is a small one).

SQL filter commands retrieve data elements from one or more tables in the database. For example, a select operation may be performed using an SQL SELECT statement. Filter conditions specify filter criteria that data elements retrieved using the SQL SELECT statement must meet to be included. When creating queries and views with SQL SELECT statements to retrieve data from the database, filter conditions are used to extract only the data elements that meet the filter conditions. The select operation is performed on a huge amount of data (over a full-table or numerous columns of tables) of the order of many Giga Bytes. In the column-oriented DBMS, the select operation processes data elements in a column and generates a subset of the data elements in the column based on some predicates (conditions) signifying the data elements that matched. These types of operations typically produce a very small amount of matching data elements relative to the table sizes.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DESCRIPTION OF EMBODIMENTS

Processing select operations using a Central Processing Unit (CPU) core ("processor core") in a System on Chip (SOC) is not efficient due to the amount of data that is read from memory into the core and often bottlenecked by the per-core read memory bandwidth.

In an embodiment, efficient data element filter logic ("hardware accelerator") in a System on Chip (SOC) that offloads computation for the select operation from the CPU core provides a balanced performance across the entire range of widths (number of bits) of data elements in a column-oriented DBMS.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
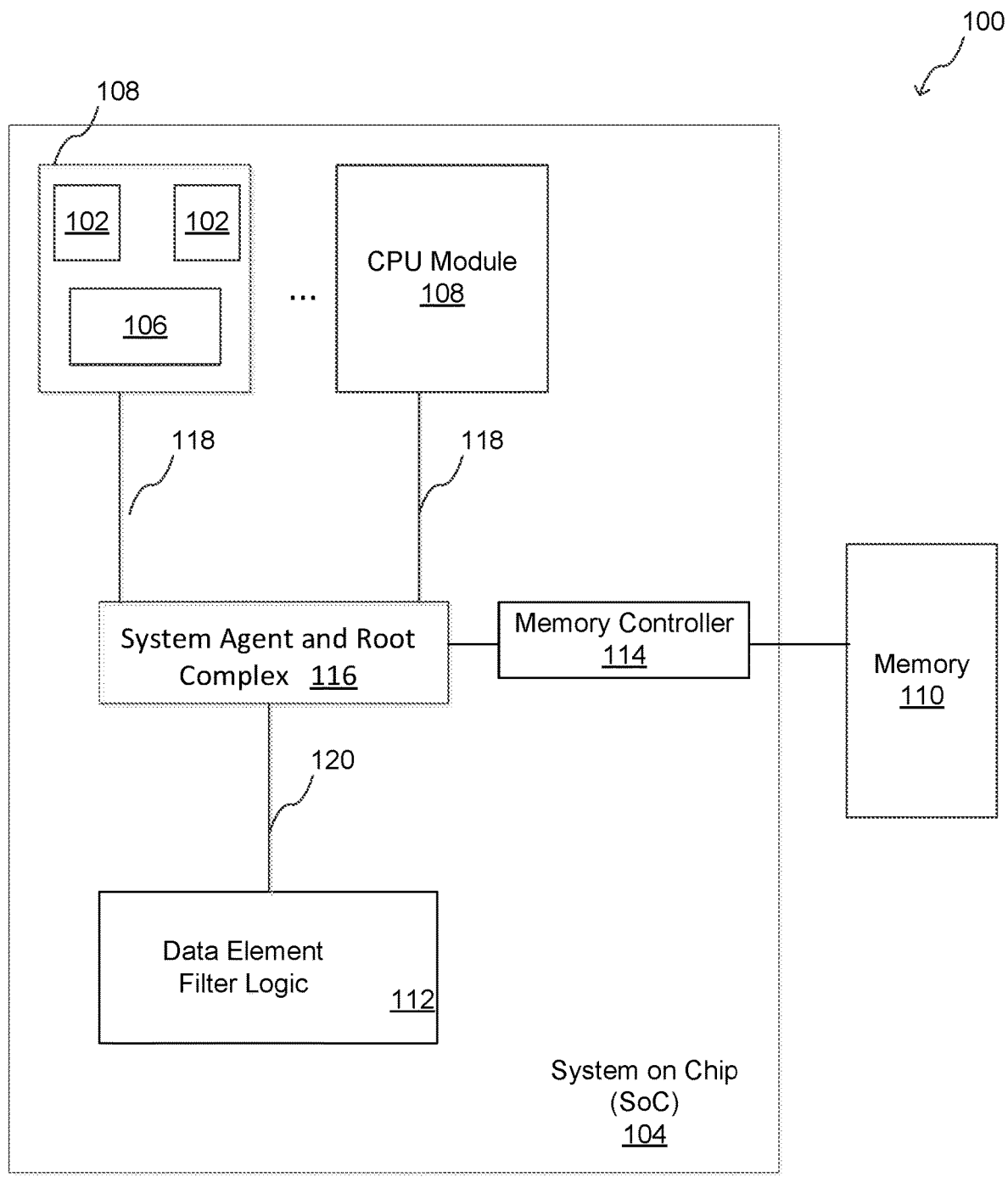
FIG. 1 is a block diagram of an embodiment of a computer system that includes Data Element Filter Logic to efficiently perform a select operation for an in-memory relational database.

FIG. 1 is a block diagram of an embodiment of a computer system 100 that includes Data Element Filter Logic 112 to efficiently perform a select operation for an in-memory relational database. The computer system 100 includes a system on chip (SOC or SoC) 104. The SOC 104 is an integrated circuit that includes at least one Central Processing Unit (CPU) module 108, a memory controller 114 and Data Element Filter Logic 112.

In the embodiment shown in FIG. 1, the CPU module 108 includes two processors also referred to as processor cores ("cores") 102 and a level 2 (L2) cache 106 that is shared by the processor cores 102 in the CPU module 108. In the embodiment shown there are two CPU modules 108, each having two processor cores 102. In other embodiments there may be more than two CPU modules 108 and the CPU modules 108 may have more than two processor cores 102. Each CPU module 108 has a dedicated point-to-point interface 118 which may be referred to as an Intra-Die-Interconnect (IDI), to a system agent and root complex 116. The system agent and root complex 116 coordinates between the L2 cache 106 in the CPU modules 108 and routes requests to other modules in the SOC 104 via the point to point interface 118. Internal transactions flow through the point to point interface 118 simultaneously in the upstream and downstream directions at full bandwidth.

In an embodiment, the system agent and root complex 116 implements bus 0 interconnect of a Peripheral Component Interconnect Express (PCIe) root complex. PCIe is a serial computer expansion bus standard developed by the PCI Special Interest Group (PCI-SIG). The PCIe root complex may be compatible with the PCI Express Base Specification Version 4.0 or other PCIe specifications or technologies based on derivatives or extensions of such PCIe specifications that are available at www.pcisig.com.

The CPU module 108 communicates with a memory controller 114 via the point to point interface 118. In an embodiment, the memory controller 114 is coupled to an external memory device 110 to store a column-oriented DBMS. The external memory device 110 may be a volatile memory or a non-volatile memory or a combination of volatile memory and non-volatile memory.

Volatile memory is memory whose state (and therefore the data stored in it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version 3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable mode memory device, such as NAND or NOR technologies, or more specifically, multi-threshold level NAND flash memory (e.g., Single-Level Cell ("SLC"), Multi-Level Cell ("MLC"), Quad-Level Cell ("QLC"), Tri-Level Cell ("TLC"), or some other NAND). A NVM device can also include a byte-addressable write-in-place three dimensional crosspoint memory device, or other byte addressable write-in-place NVM devices, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

The CPU modules 108 may communicate with the Data Element Filter Logic 112 via a system fabric interconnect 120. In one embodiment the system fabric interconnect 120 is an Intel On-Chip System Fabric (IOSF), a scalable fabric that supports Peripheral Component Interconnect Express (PCIe) headers and ordering rules. In other embodiments, the system fabric interconnect 120 may be another on-chip bus, for example, ARM's Advanced Microcontroller Bus Architecture (AMBA) interconnect platform, MIPS SoC-it, IBM's CoreConnect or the Open Core Protocol (OCP). In another embodiment, the Data Element Filter Logic 112 may be included in the memory controller 114.

In computer programming, an Application Programming Interface (API) is a set of subroutine definitions, protocols, and tools for building application software. The CPU module 108 processes an Application Programming Interface (API) SQL Select command to retrieve data stored in a column in a table in the in-memory database by sending a request for a select operation to the Data Element Filter Logic 112. In an embodiment the request is sent in a select command that includes a bit vector that identifies which data elements in the column in a table in the in-memory database to select from all of the data elements stored in the column. The bit vector has a bit per data element in the column. The state of the bit in the bit vector is a logical '1' or logical '0' to indicate whether the data element is to be selected from the column.

For example, the table could include records for residents of a state that includes a column for the resident's age and a column for the resident's city. The bit vector may identify the data elements ("elements") in the city column for each resident that is 65+ years old. For example, in a table in which the column has eight data elements and the bit vector representing "age 65+" is "10001100", the select command will retrieve the first, fifth and sixth data elements from the city column based on the position of the logical '1's in the bit vector.

Figure 2:
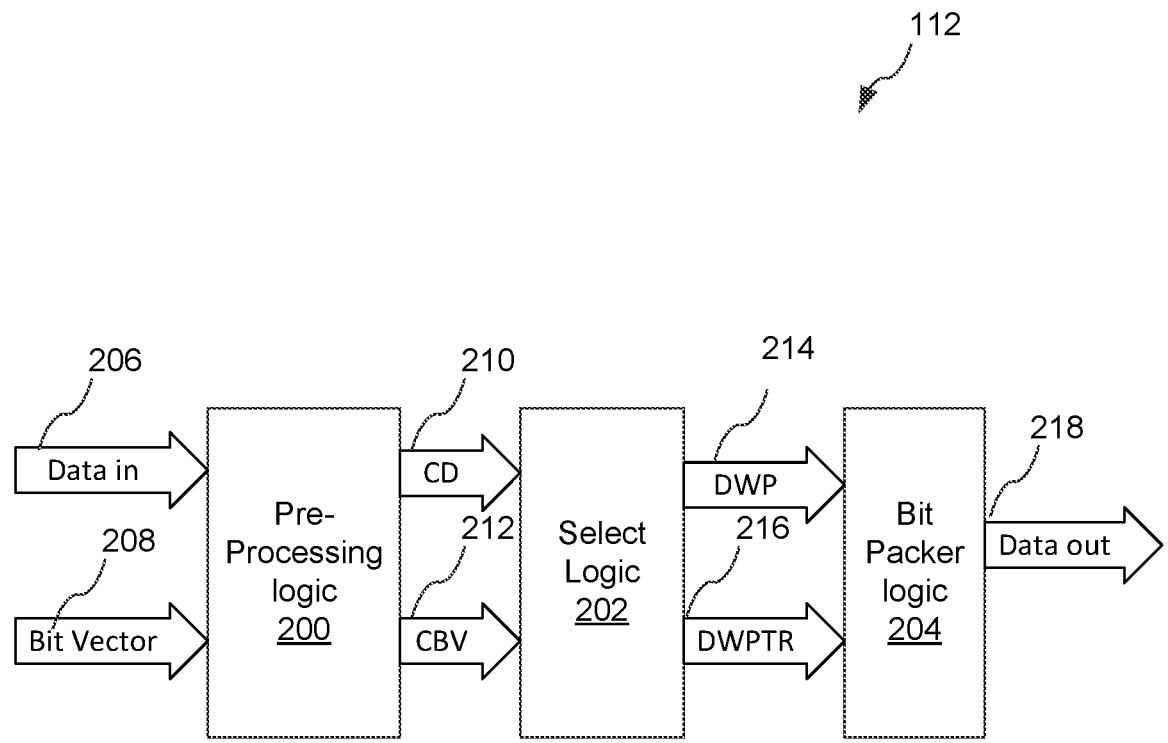
FIG. 2 is a block diagram of an embodiment of Data Element Filter Logic that performs the select operation on an array of data elements.

FIG. 2 is a block diagram of an embodiment of Data Element Filter Logic 112 that performs the select operation on an array of data elements. The array of data elements may be a column of a table in the in-memory relational database.

The Data Element Filter Logic 112 includes three processing stages, pre-processing logic 200 to pre-condition the input streams (array of data elements in the data path 206 and select bit vector 208), select logic 202 to perform the selection of the data elements from the array of data elements, and bit packer logic 204 to pack the bits output from the select logic 202 corresponding to the valid bits in the select bit vector 208. In an embodiment, the processing stages provide good throughput for all bit widths (for example, 1 bit to 32 bits) of data elements in the array of data elements (that is, the data elements stored in a column in the table in the in-memory database).

The select operation that is processed by the Data Element Filter Logic 112 includes a bit vector 208 to select data elements within the data path 206. The data elements may be retrieved from memory using Direct Memory Access (DMA) and the Data Element Filter Logic 112 can process a data path width of retrieved data elements while the next data elements in the column are being retrieved. The select command (API) may also include the number of data elements in the column and the data element bit width (number of bits) in the column. The number of bits in the bit vector 208 may match the total number of data elements in the column.

In an embodiment, in each cycle through the Data Element Filter Logic 112, the Data Element Filter Logic 112 processes data elements stored in the column of a table in the in-memory database that are fully contained within a data path width. For example, if there are 150 data elements in the column, each data element in the column data has a bit width of 3 bits, and the width of the data path 206 to the Data Element Filter Logic 112 is 32 bits, 10 data elements (3 bits) are fully contained (30 bits of the 32 data path) in the data path width and can be processed per cycle. Thus, it will take 15 cycles to process 150 3-bit data elements. In other embodiments, the width of the data path 206 may be greater than 32, allowing more data elements to be processed in each cycle. For example, the width of the data path may be 64 bits or 128 bits.

Figure 3A:
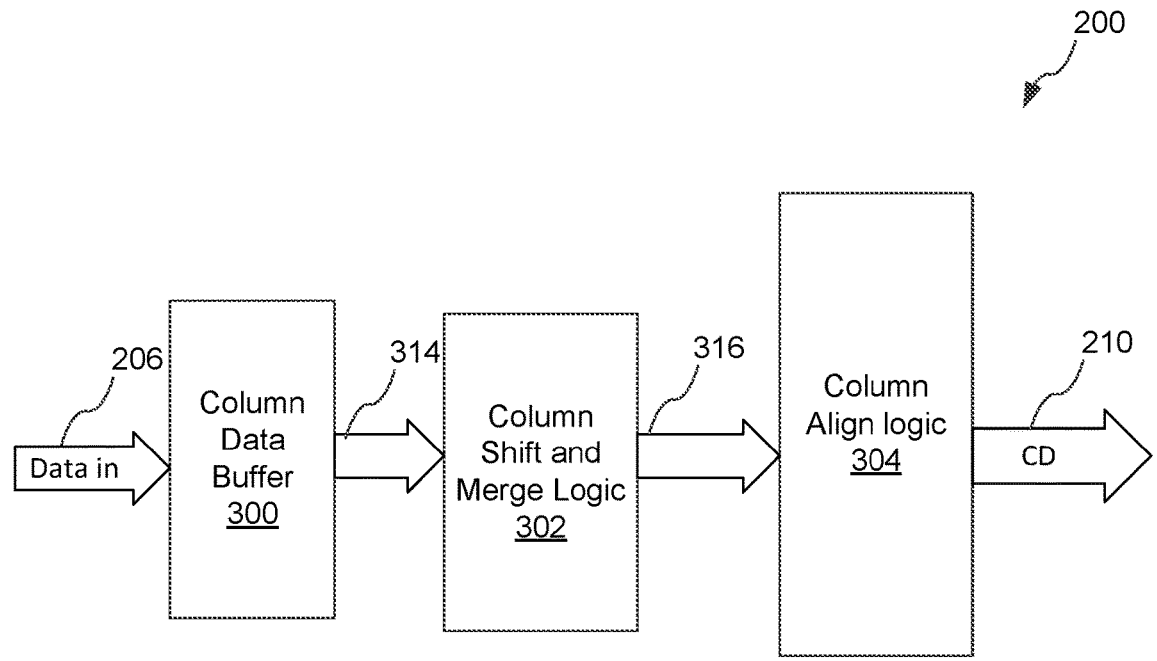
FIG. 3A is a block diagram of conditioning logic in the pre-processing logic to condition the column data.
Figure 3B:
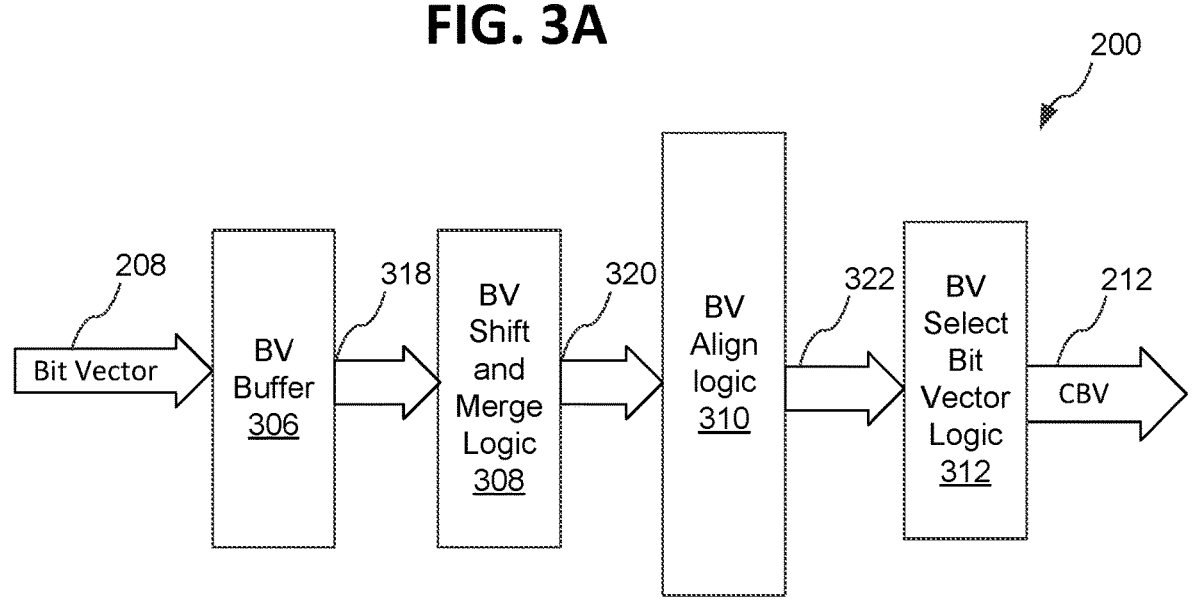
FIG. 3B is a block diagram of conditioning logic in the pre-processing logic used to condition the bit vector stored in bit vector buffer.

FIGS. 3A and 3B are a block diagram of the pre-processing logic 200 in the Data Element Filter Logic 112 shown in FIG. 2. In one embodiment, the data path 206 is processed 32 bits per cycle together with a 32 bit vector 208 indicating which of the data elements are to be selected from the data path 206.

FIG. 3A is a block diagram of conditioning logic in the pre-processing logic 200 to condition the bit vector 208. The data elements in the data path 206 input to the pre-processing logic 200 are shifted at the end of a cycle based on the number of bits consumed in the previous cycle. The number of bits shifted at the end of the cycle is a fixed number based on the number of bits in each data element (data element width) in the data path 206, such that the conditioned column data (CD) 210 that is output from the pre-processing unit is aligned with the conditioned bit vector (CBV) 212. In an embodiment in which 32 bits of column data are received each cycle, 32 bits of buffered column data 314 stored in the column data buffer 300 is input to the column data shift and merge logic 302 which aligns the buffered column data 314 so that the first valid bit is in bit position 0 by shifting the bits in the buffered column data 314 that were not consumed in the previous cycle and merging them with the next 32 bits of buffered column data 314. The shifted and merged column data 316 is input to the align logic 304 that converts shifted and merged column data 316 that has a data width twice the width of data path 206 to conditioned column data 210 that is the same data width as the data path 206. In an embodiment in which the column data 210 is 32 bits, the shifted and merged column data 316 is 64 bits.

FIG. 3B is a block diagram of conditioning logic in the pre-processing logic 200 used to condition the bit vector 208 stored in bit vector buffer 306. Each bit in the bit vector 208 is associated with one data element in the data path 206. The data element may have a single bit or more than one bit. In an embodiment in which the data path 206 is 32 bits, the width (number of bits) of the data element may be 1-32 bits. The bit vector 208 is pre-processed such that if the data element in the data path 206 has more than one bit, each bit of the bit vector is replicated to match and align with the number of bits in the corresponding data element.

For example, if each data element in the data path 206 has three bits, the first bit in the bit vector 208 is replicated by the pre-processing logic 200 so that there are three bits in the conditioned bit vector 212 corresponding to the three bits in the data element in the conditioned column data 210. The conditioned column data (CD) 210 and conditioned bit vector (CBV) 212 output by the pre-processing logic 200 are input to the select logic 202 in the Data Element Filter Logic 112 shown in FIG. 2.

Figure 4A:
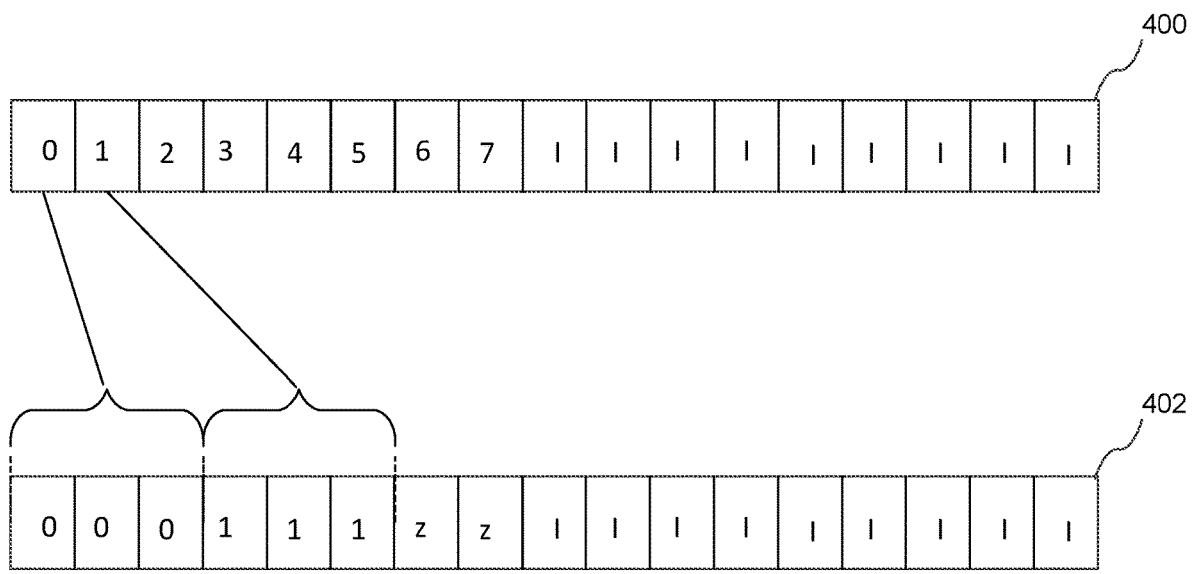
FIGS. 4A and 4B illustrate how the bit vector is pre-processed by the pre-processing logic for back to back cycles for a column with data element width of 3 bits assuming the width (number of bits) of the hardware data path is 8 bits.
Figure 4B:
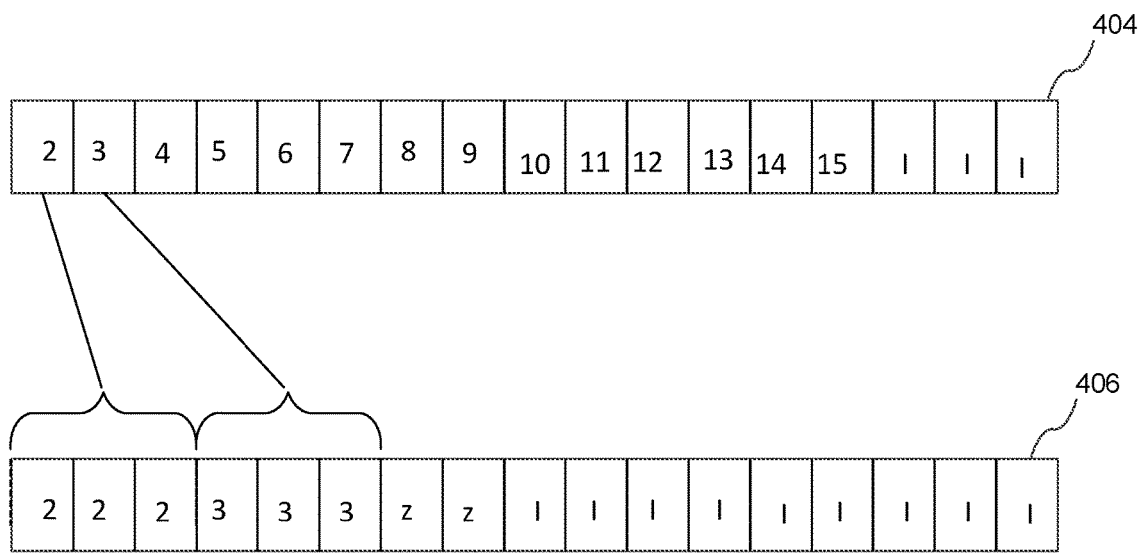

FIGS. 4A and 4B illustrate how the bit vector 208 is pre-processed by the pre-processing logic 200 for back to back cycles for a column with data element width of 3 bits assuming the width (number of bits) of the hardware data path 206 is 8 bits;

FIG. 4A illustrates a first cycle and FIG. 4B illustrates a subsequent cycle in the pre-processing logic 200.

FIGS. 4A and 4B will be described in conjunction with the embodiment of the pre-processing logic 200 in FIGS. 3A and 3B for an embodiment with bit vector 208 having 8 bits and data path 206 having 8 bits. Each bit in the bit vector 208 (FIG. 3B) corresponds to one 3-bit data element in the data path 206 (FIG. 3A).

FIG. 4A illustrates a first 16 bit vector 400 (bit vector 400 output from the bit vector shift and merge logic 308 (FIG. 3B)) and a second 16-bit vector 402 (select bit vector output from the select bit vector logic 312 (FIG. 3B)). The bit vector shift and merge logic 308 receives 8 bits of bit vector and outputs 16 bits (that is, the twice the data path width of 8 bits) to provide additional bits to store bits that may be residue when only partial bits of the bit vector can be processed. The numbers in the bit vectors 400, 402 represent an index to the bit vector 208 (FIG. 3B).

In a first cycle, the first bit in bit vector 400 labeled '0' and the second bit labeled '1' are replicated by the bit vector align logic 310 (FIG. 3B) and select bit vector logic 312 (FIG. 3B) such that as shown in bit vector 402, the first six bits include three copies of the bit labeled '0' corresponding to the first 3-bit data element and three copies of the bit labeled '1' in the bit vector corresponding to the second 3-bit data element. With only two remaining bits in the 8-bit data path, there are insufficient bits (only 2 of the 3 required for a 3-bit wide data element) to replicate the next bit in bit vector 400 labeled '2' corresponding to the third 3-bit data element in the data path 206 (FIG. 3A) so the two remaining bits (residue) that are labeled "z" are set to logical '0' indicating that the corresponding data bit in the data path 206 is not to be selected. The first 8 bits of bit vector 402 '000111zz" are output as the conditioned bit vector 212 for the first cycle.

In the shift and merge logic 308 the remaining 6 bits (labeled 2,3,4,5,6,7) from the first ("prior") cycle are shifted based on the two bits (labeled 0,1) consumed in the prior cycle and merging new bits (labeled 8,9,10,11,12,13,14,15) from the bit vector 208 for the next cycle. This is accomplished with a shift and merge logic 308 (FIG. 3B) similar to the shift and merge logic 302 (FIG. 3A) for pre-processing the data elements in the data path 206.

FIG. 4B illustrates the subsequent 16 bit vector 400 (bit vector 400 output from the bit vector shift and merge logic 308 (FIG. 3B)) and a second 16-bit vector 402 (select bit vector output from the select bit vector logic 312 (FIG. 3B)). For the subsequent cycle, the remaining bits (bits 2 to 7) from bit vector 400 in the prior cycle have been shifted in the shift and merge logic 308 so that the bit labeled "2" in bit vector 400 (FIG. 4A) corresponding to the third data element in data path 206 (FIG. 3A) can be processed. In addition, in bit vector 404, the next 8 bits (bits 8 to 15) of bit vector 208 (FIG. 3B) have been merged with the remaining 6 bits (labeled 2,3,4,5,6,7) from the prior cycle.

In the subsequent cycle, the first bit labeled '2' and the second bit labeled '3' in bit vector 404 are replicated in bit vector 406 such that the first six bits of bit vector 406 include three copies of the bit labeled '2' corresponding to the next 3-bit data element in data path 206 (FIG. 3A) and three copies of the bit labeled '3' in the bit vector corresponding to the next 3-bit data element in data path 206 (FIG. 3A). With only two remaining bits in the 8-bit data path, there are insufficient bits (only 2 of the 3 required for a 3-bit wide data element) to replicate the next bit labeled '4' in bit vector 406 corresponding to the next 3-bit data element in the data path 206 (FIG. 3A) so the two remaining bits (residue) that are labeled "z" in bit vector 406 are set to logical '0' indicating that the corresponding data bits in the data path 206 (FIG. 3A) are not to be selected.

Table 1 below illustrates bit vector index mapping and the number of bits consumed per cycle dependent on the number of bits per data element in data path 206 (FIG. 3A) for an 8-bit bit vector as described in conjunction with FIGS. 4A-4B. The bus index 0-7 in the first column is the position of the bit in an 8-bit bit vector. The width of the data element in the data path 206 (FIG. 3A) can range from 1-8 bits. As shown in the table, the number of bits of the bit vector that are consumed per cycle is dependent on the element width (number of bits in the data element). As discussed earlier for the example of a column with a data element width of 3-bits, 2 bits of the bit vector are consumed in each cycle. As shown in Table 1, the number of bits consumed per cycle can range from 8 (element width of 1) to 1 (element width of 5-8 bits).

TABLE 1

Bit Vector Index Mapping and Bits Consumed

| Bus Index | Element Width | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | 1 | 0 | 0 | 0 | 0 | 0 | 0 | 0 |
| 2 | 2 | 1 | 0 | 0 | 0 | 0 | 0 | 0 |
| 3 | 3 | 1 | 1 | 0 | 0 | 0 | 0 | 0 |
| 4 | 4 | 2 | 1 | 1 | 0 | 0 | 0 | 0 |
| 5 | 5 | 2 | 1 | 1 | ZERO | 0 | 0 | 0 |
| 6 | 6 | 3 | ZERO | 1 | ZERO | ZERO | 0 | 0 |
| 7 | 7 | 3 | ZERO | 1 | ZERO | ZERO | ZERO | 0 |
| Bits Consumed | 8 | 4 | 2 | 2 | 1 | 1 | 1 | 1 |

Figure 5:
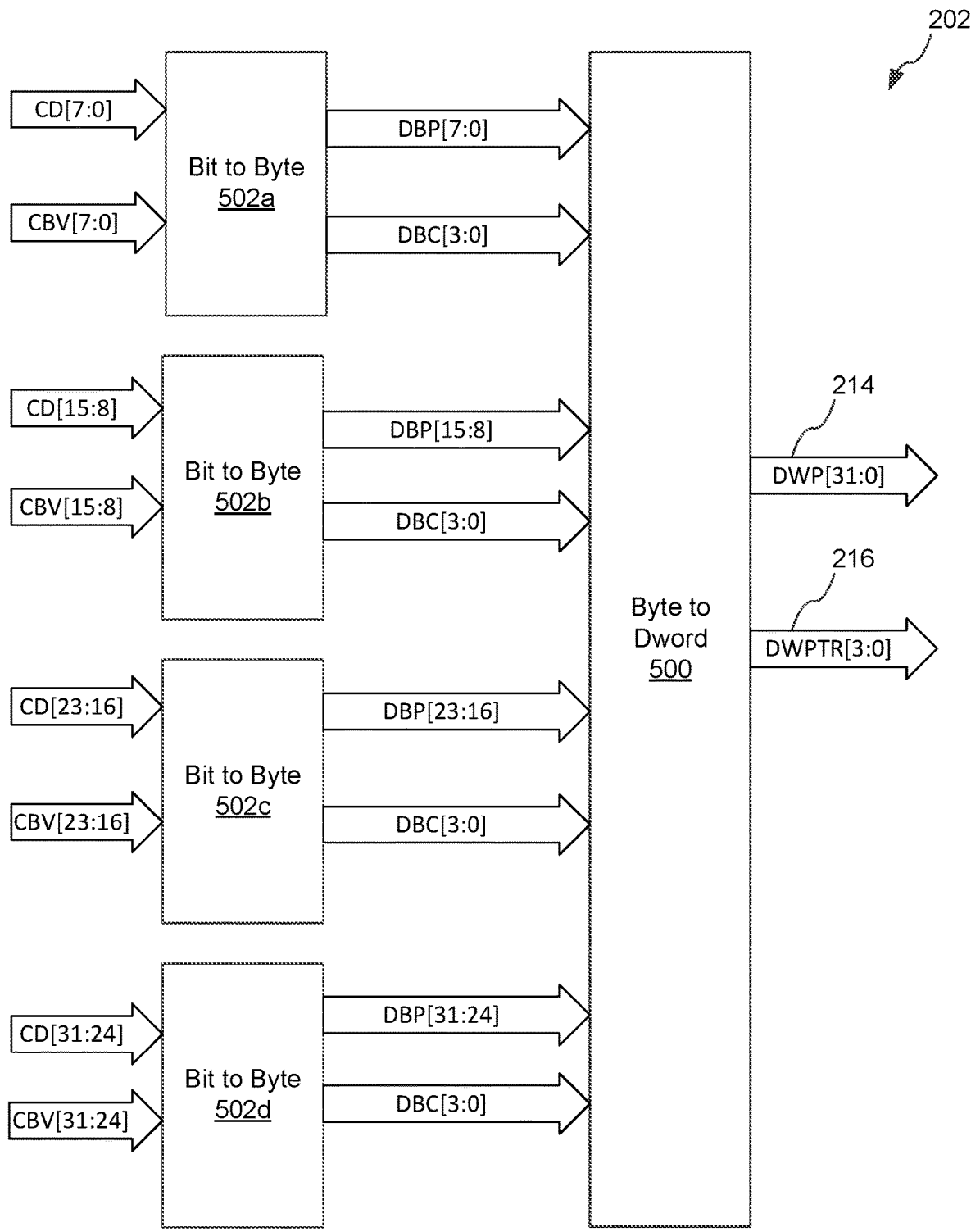
FIG. 5 is a block diagram of the select logic shown in FIG. 2.

FIG. 5 is a block diagram of the select logic 202 shown in FIG. 2. The select logic 202 performs a select function using the conditioned column data (CD) 210 and conditioned bit vector (CBV) 212 received from the pre-processing logic 200. As the conditioned column data 210 and conditioned bit vector 212 have taken the width of the data element into consideration, the select function is performed on a bit by bit basis. For each bit in the conditioned column data 210, if the corresponding bit in the conditioned bit vector 212 is set (for example, logical '1'), the corresponding bit in the conditioned column data 210 is output. If the corresponding bit in the conditioned bit vector 212 is not set (for example, logical '0'), the corresponding bit in the conditioned column data 210 is not output (that is, the bit is skipped).

A block diagram of the select logic 202 for a 32 bit column data path is shown in FIG. 5. In the embodiment shown, the select logic 202 has two stages. In other embodiments, the select logic can be pipelined into more than two stages.

In the first stage of the two stage select logic 202 shown in FIG. 5, there are four bit to byte packers 502a, 502b, 502c, 502d. Each of the four bytes (bits [7:0], bits[15:8], bits [23:16] and bits [31:24]) of the 32-bit datapath is packed independently by one of the bit to byte packers 502a, 502b, 502c, 502d.

Each of the bit to byte packers 502a, 502b, 502c, 502d outputs a respective byte of data (DBP [7:0], DBP[15:8], DBP[23:16], DBP[31:24]) whose bits have been packed and a respective corresponding count (DBC[3:0]) of how many bits are valid in the byte of data. The count of valid bits is computed by counting each bit in the byte that has a corresponding mask bit that is set indicating that the bit is valid.

In the second stage, a byte to dword packer 500 packs the already packed bits within each byte (DBP [7:0], DBP[15:8], DBP[23:16], DBP[31:24]) to form packed bits within a 32 bit dword (DWP[31:0]). The selected bits are then packed together in bit packer logic 204 based on the number of valid bits (DWPTR[5:0]).

Figure 6:
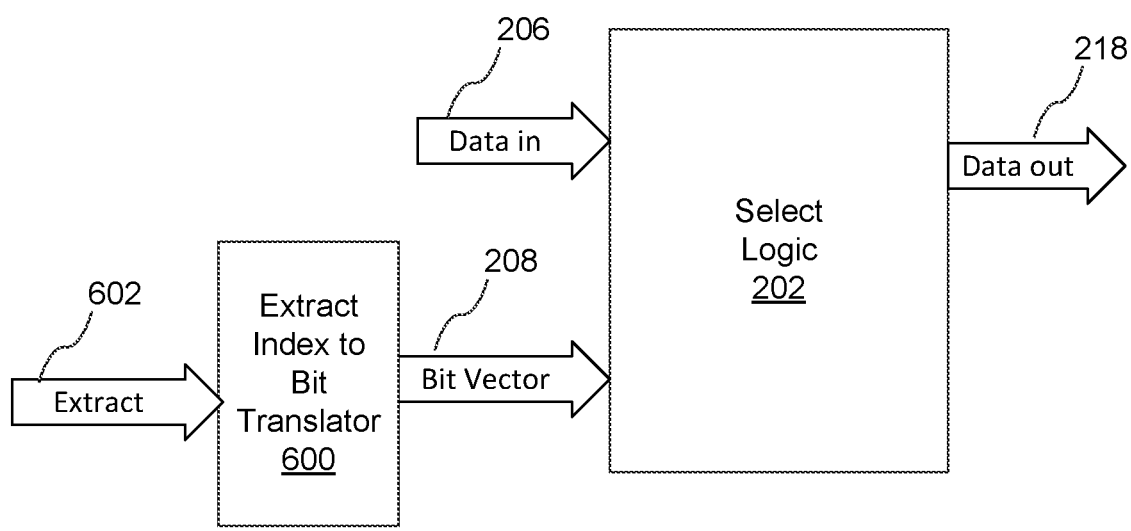
FIG. 6 is a block diagram of an embodiment of logic to perform an extract operation.

FIG. 6 is a block diagram of an embodiment of logic to perform an extract operation. The Extract operation ("command") selects specific contiguous data elements ("entries") in a given column of a table. The "extract" operation is functionally a special case of the "select" operation in which the selected data elements are contiguous. Instead of a bit vector that selects each data element in the column data, an API to perform an extract function may include the number of data elements in the data column to skip and the number of contiguous data elements in the data column to extract or the extract function may be initiated via an API that includes indices to the first and last data element to be extracted from the data column and the width (number of bits) of each data element in the data column. In another example, an extract function may be initiated via an API that includes indices to the first and last bit to be extracted from the data column in the table.

In an embodiment shown in FIG. 6, some logic is shared between select and extract to reduce the cost of the data element filtering logic. The extract is implemented using the select logic 202 described in conjunction with FIG. 5.

Referring to FIG. 6, extract parameters 602 included in the API are input to an extract index to bit translator logic 600 that translates an extract index in the received extract parameters 602 associated with the extract function to an equivalent bit vector 208. The extract index to bit translator logic 600 includes a state machine that keeps track of the data element/data bit that has been translated. A logic "1" is output to the Select logic between the start index (identifying the first data element to be extracted from the data column) and last index (identifying the last data element to be extracted from the data column). When performing the extract function, the select logic 202 can treat the column data to be extracted as one bit data elements for maximum throughput.

Figure 7:
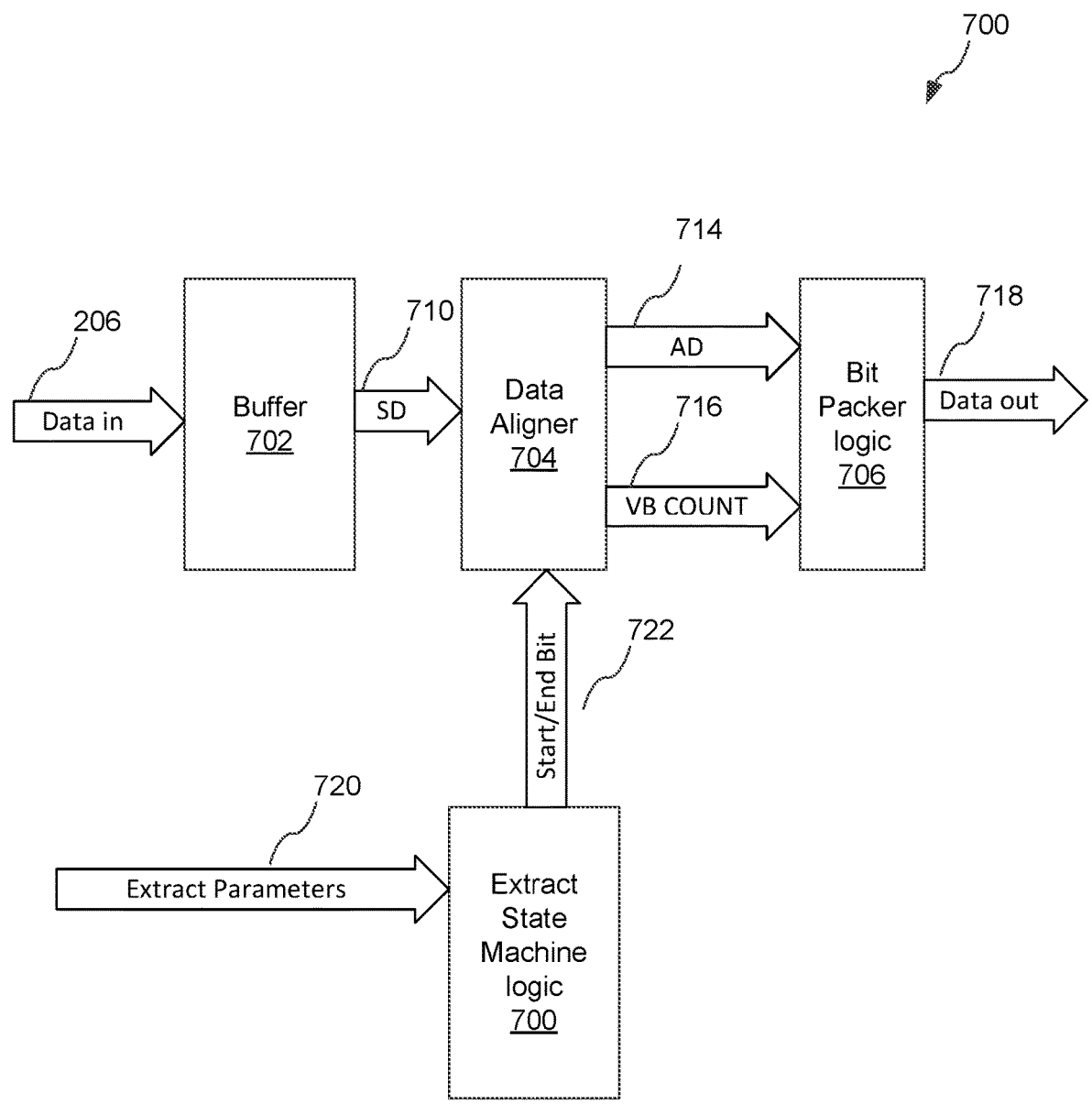
FIG. 7 is a block diagram of an embodiment of extract logic that is separate from the select logic shown in FIG. 5.

FIG. 7 is a block diagram of an embodiment of extract logic 700 that is separate from the select logic 202 shown in FIG. 5. Extract logic 700 receives extract parameters 720 and generates the position of the start bit and the end bit for the contiguous data elements to be extracted from the data path 206. A data aligner 704 shifts the column data based on the start bit so that the data is aligned (first valid bit at bit [0]). The data aligner 704 computes a valid bit "VB" count 716 based on the position of the start and end bits 722 in the data path 206. Finally, the bit packer logic 706 packs the bits from each cycle using the received aligned data ("AD") 714 and valid bit "VB" count 716. In both embodiments of the extract logic (FIG. 6 and FIG. 7) the selected bits to be extracted are always contiguous. Therefore, the bit packer logic 706 includes a simple shifter logic to pack the bits instead of the bit to byte and byte to double word (dword) (8 bit to 32 bit) packers discussed in conjunction with the embodiment in FIG. 5.

The Data Element Filter Logic 112 provides the best tradeoff between throughput (number of data elements processed per cycle) and cost (complexity and amount of logic). In another embodiment, the Data Element Filter Logic 112 can be fully pipelined to process the full width of the data path 206 in every cycle.

In an embodiment, in each cycle through the Data Element Filter Logic 112, the Data Element Filter Logic 112 is fully pipelined. In contrast to the embodiment described earlier in conjunction with Table 1, that only processes data elements stored in the column of a table in the in-memory database that are fully contained within a data path width, all bits in the data path width are processed per cycle in the fully pipelined embodiment. The fully pipelined embodiment of the Data Element Filter Logic 112 has a higher throughput than the non-fully pipelined embodiment described earlier.

In an embodiment in which the Data Element Filter Logic 112 is fully pipelined, it takes 14 cycles to process 150 3-bit data elements by including partial data elements in some cycles to fill the 32 bit data path width in contrast to the non-fully pipelined embodiment described in conjunction with Table 1 in which it takes 15 cycles to process 150 3-bit data elements.

Table 2 below illustrates bit vector index mapping and the number of bits consumed per cycle dependent on the number of bits per data element for an 8-bit bit vector in an embodiment in which the Data Element Filter Logic 112 is fully pipelined. In contrast to the embodiment of the pre-processing logic 200 described in conjunction with FIGS. 3A, 3B, partial data elements may be processed in a cycle to ensure that the pipeline is full. The pre-processing logic 200 keeps track of the partial data elements that are being processed on each cycle dependent on the width of the data element in the column data. The output of the bit vector shift and merge logic 308 is dependent on the input bit vector 318 and number of bits consumed in a cycle. The number of bits consumed is dependent on data element width and "cycle count". For a given data path width and data element width, the bit consumption and replication pattern repeats after a certain number of cycles (period).

TABLE 2

| | Bit Vector Bits Consumed | | | | | | | |
|---|---|---|---|---|---|---|---|---|
| | Cycle Count | | | | | | | Period |
| Element Width | 0 | 1 | 2 | 3 | 4 | 5 | 6 | (cycles) |
| 1 | 8 | | | | | | | 1 |
| 2 | 4 | | | | | | | 1 |
| 3 | 3 | 3 | 2 | | | | | 3 |
| 4 | 2 | | | | | | | 1 |
| 5 | 2 | 2 | 1 | 2 | 1 | | | 5 |
| 6 | 2 | 1 | 1 | | | | | 3 |
| 7 | 2 | 1 | 1 | 1 | 1 | 1 | 1 | 7 |

Similar to the non-fully pipelined embodiment discussed earlier in conjunction with Table 1, Table 2 summarizes the number of bits of the column data consumed in each cycle for data path width of 8 bits and data element widths ranging from 1-8 for an embodiment in which the Data Element Filter Logic 112 is fully pipelined. When a data element in the column data is partially processed, it is considered consumed. However, the value of the partially processed data element is stored in a temporary register in addition to the number of bit replications for the data element remaining which is dependent on the cycle count.

As shown in Table 2, for data element ("element") widths that are power of 2 (element width 1, 2, 4 bits), the mapping is trivial, and the period is 1 cycle with no cycle count dependency. For element width 3, 5, 6 and 7 bits, the period ranges from 3 cycles to 7 cycles.

Figure 8A:
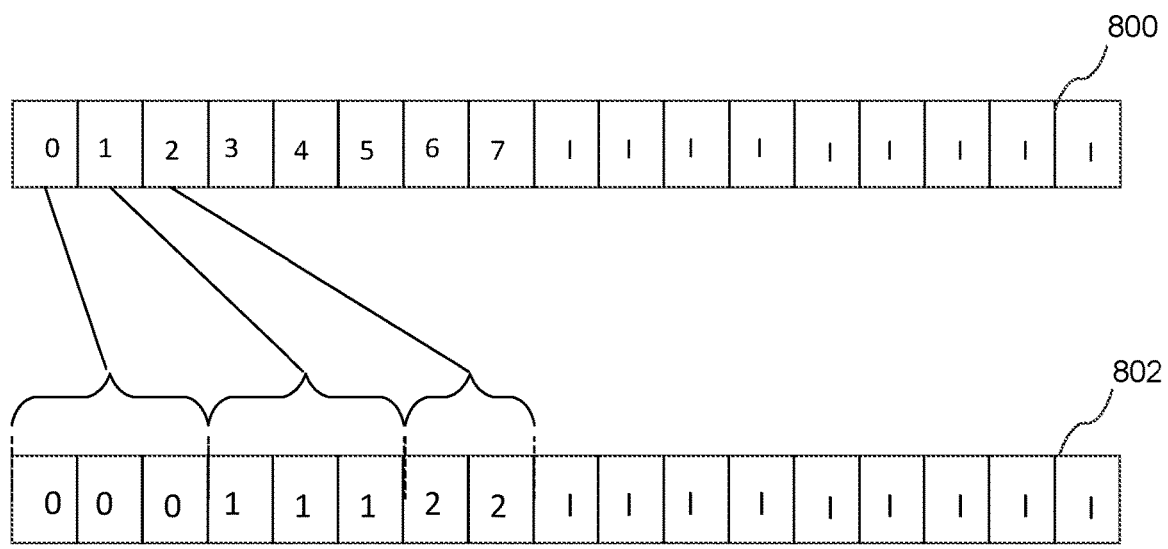
FIGS. 8A and 8B illustrate how the bit vector is pre-processed by the pre-processing logic for back to back cycles for a column with data element width of 3 bits assuming data path width is 8 bits for an embodiment in which the pre-processing logic is fully pipelined.
Figure 8B:
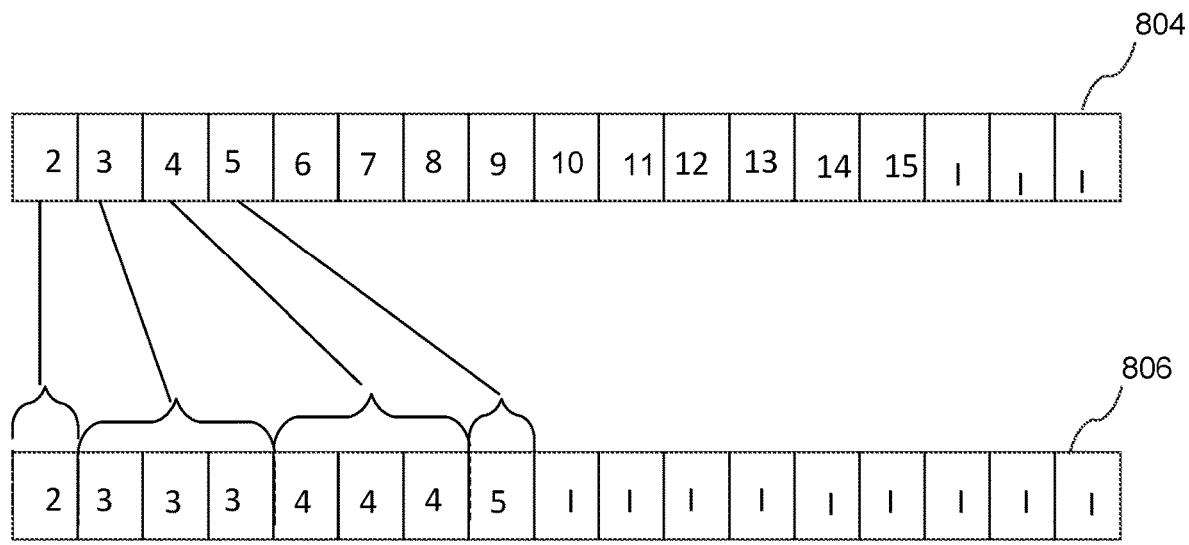

FIGS. 8A and 8B illustrate how the bit vector 208 is pre-processed by the pre-processing logic 200 for back to back cycles for a column with a data element width of 3 bits assuming data path width is 8 bits for an embodiment in which the pre-processing logic is fully pipelined data path 206. FIG. 8A illustrates a first cycle and FIG. 8B illustrates a subsequent cycle in the pre-processing logic 200.

FIGS. 8A and 8B will be described in conjunction with the embodiment of the pre-processing logic 200 in FIGS. 3A and 3B for an embodiment with bit vector 208 having 8 bits and data path 206 having 8 bits. Each bit in the bit vector 208 (FIG. 3B) corresponds to one 3-bit data element in the data path 206 (FIG. 3A).

FIG. 8A illustrates a first 16 bit vector 800 (bit vector 400 output from the bit vector shift and merge logic 308 (FIG. 3B)) and a second 16-bit vector 802 (select bit vector output from the select bit vector logic 312 (FIG. 3B)). The bit vector shift and merge logic 308 receives 8 bits of bit vector and outputs 16 bits (that is, the twice the data path width of 8 bits) to provide additional bits to store additional bits that may be residue when only partial bits of the bit vector can be processed. The numbers in the bit vectors 800, 802 represent an index to the bit vector 208.

In a first cycle, the first bit in bit vector 800 labeled '0' and the second bit labeled '1' are replicated by the bit vector align logic 310 (FIG. 3B) and select bit vector logic 312 such that as shown in bit vector 402, the first six bits include three copies of the bit labeled '0' corresponding to the first 3-bit data element and three copies of the bit labeled '1' in the bit vector corresponding to the second 3-bit data element. With only two remaining bits in the 8-bit data path, there are insufficient bits (only 2 of the 3 required for a 3-bit wide data element) to replicate the next bit in bit vector 800 labeled '2' corresponding to the third 3-bit data element in the data path 206 (FIG. 3A). The third 3-bit data element is partially processed by replicating the bit labeled '2' twice because there are two additional bits available in the data path. The first 8 bits of vector 802 '00011122' are output as the conditioned bit vector 212 for the first cycle.

In the shift and merge logic 308 the remaining 6 bits (labeled 2,3,4,5,6,7) from the first ("prior") cycle are shifted based on the two bits (labeled 0,1) consumed in the prior cycle and merging new bits (labeled 8,9,10,11,12,13,14,15) from the bit vector 208 for the next cycle. This is accomplished with a shift and merge logic 308 similar to the shift and merge logic 302 for pre-processing the data elements in the data path 206.

FIG. 8B illustrates the subsequent 16 bit vector 400 (bit vector 400 output from the bit vector shift and merge logic 308 (FIG. 3B)) and a second 16-bit vector 802 (select bit vector output from the select bit vector logic 312 (FIG. 3B)). For the subsequent cycle, the remaining bits (bits 2 to 7) from bit vector 400 in the prior cycle have been shifted in the shift and merge logic 308 so that the last bit labeled "2" in bit vector 800 (FIG. 4A) corresponding to the third bit of the third data element in data path 206 (FIG. 3A) can be processed. In addition, in bit vector 404, the next 8 bits (bits 8 to 15) of bit vector 208 (FIG. 3B) have been merged with the remaining 6 bits (labeled 2,3,4,5,6,7) from the prior cycle.

In the subsequent cycle, the bit labeled '3' and the next bit labeled '4' and the next bit labeled '5' in bit vector 804 are replicated in bit vector 406 such that bit vector 406 includes the last bit of the third element labeled '2', three copies of the bit labeled '3' corresponding to the next 3-bit data element in bit vector 208 (FIG. 3A) and three copies of the bit labeled '4' in the bit vector corresponding to the next 3-bit data element in bit vector 208 (FIG. 3A). With only one remaining bit in the 8-bit data path, there are insufficient bits (only 1 of the 3 required for a 3-bit wide data element) to replicate the next bit labeled '5' in bit vector 406 corresponding to the next 3-bit data element in the data stream. The next 3-bit data element is partially processed by replicating the bit labeled '5' once because there is one additional bit available in the data path. The first 8 bits of vector 806 '23334445' are output as the conditioned bit vector 212 for the second cycle.

Figure 9:
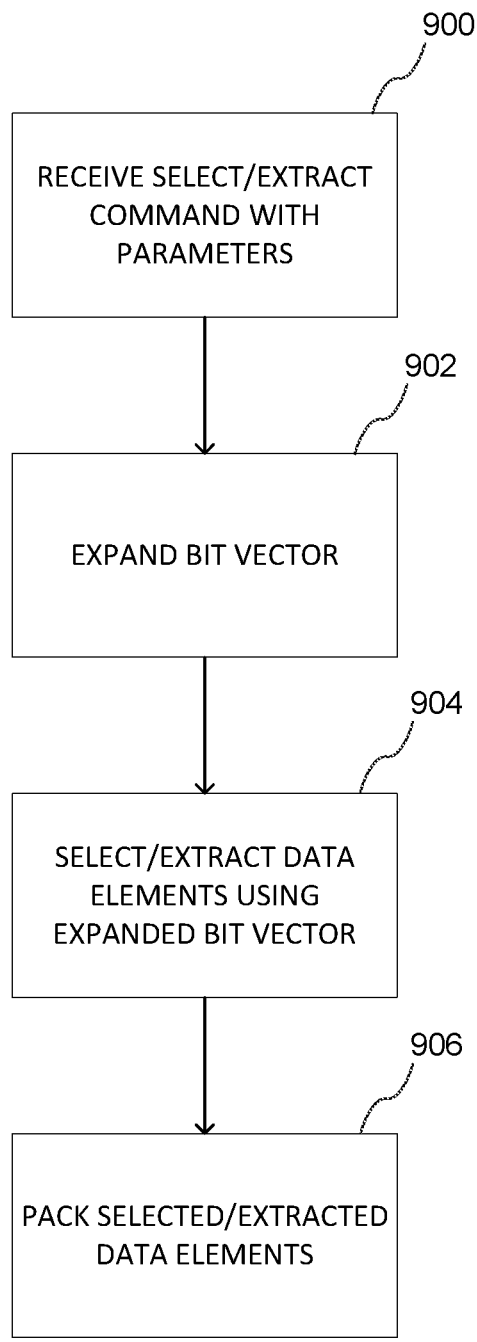
FIG. 9 is a method performed by the Data Element Filter Logic.

FIG. 9 is a method performed by the Data Element Filter Logic 112.

At block 900, the Data Element Filter Logic 112 receives an extract or select command with parameters. The parameters may include a bit vector identifying the data elements to select or an identification of the first and last data elements to extract, and the data width (number of bits) of the data elements in the column data.

At block 902, the data element filtering logic expands the bit vector based on the data width. The bit vector is expanded for a fully pipelined embodiment of the Data Element Filter Logic 112 or a non-fully pipelined embodiment of the Data Element Filter Logic 112 as described earlier.

At block 904, the data elements are selected/extracted using the expanded bit vector.

At block 906, the bits of the selected/extracted data elements are packed prior to being returned as the result of the select/extract command.

Figure 10:
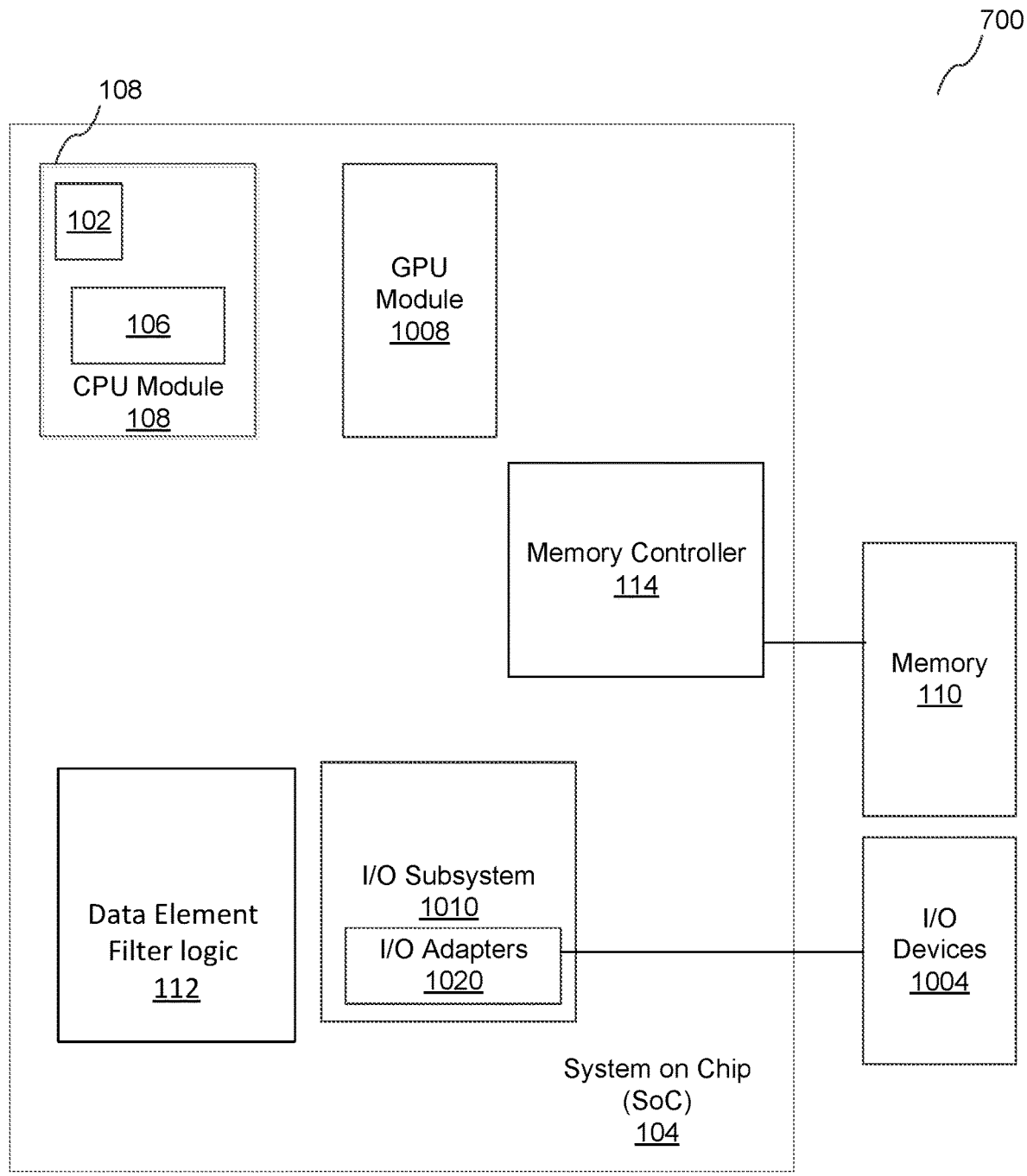
FIG. 10 is a block diagram of an embodiment of a computer system that includes Data Element Filter Logic to efficiently perform a select operation in an in-memory relational database.

FIG. 10 is a block diagram of an embodiment of a computer system 1000 that includes Data Element Filter Logic 112 to efficiently perform a select operation in an in-memory relational database. Computer system 1000 may correspond to a computing device including, but not limited to, a server, a workstation computer, a desktop computer, a laptop computer, and/or a tablet computer.

The computer system 1000 includes a system on chip (SOC or SoC) 104 which combines processor, graphics, memory, and Input/Output (I/O) control logic into one SoC package. The SOC 104 includes at least one Central Processing Unit (CPU) module 108, a memory controller 114, a Graphics Processor Unit (GPU) 1008, an Input/Output (I/O) System 710 and Data Element Filter Logic 112. Although not shown, each processor core 102 may internally include one or more instruction/data caches, execution units, prefetch buffers, instruction queues, branch address calculation units, instruction decoders, floating point units, retirement units, etc. The CPU module 108 may correspond to a single core or a multi-core general purpose processor, such as those provided by Intel® Corporation, according to one embodiment.

The Graphics Processor Unit (GPU) 1008 may include one or more GPU cores and a GPU cache which may store graphics related data for the GPU core. The GPU core may internally include one or more execution units and one or more instruction and data caches. Additionally, the Graphics Processor Unit (GPU) 1008 may contain other graphics logic units that are not shown in FIG. 15, such as one or more vertex processing units, rasterization units, media processing units, and codecs.

Within the I/O subsystem 1010, one or more I/O adapter(s) 1020 are present to translate a host communication protocol utilized within the CPU core(s) 102 to a protocol compatible with particular I/O devices. Some of the protocols that adapters may be utilized for translation include Peripheral Component Interconnect (PCI)-Express (PCI-E), 3.0; Universal Serial Bus (USB), 3.0; Serial Advanced Technology Attachment (SATA), 3.0; Small Computer System Interface (SCSI), Ultra-640; and Institute of Electrical and Electronics Engineers (IEEE) 1594 "Firewire.

The I/O adapter(s) 1020 may communicate with external I/O devices 1004 which may include, for example, user interface device(s) including a display, a touch-screen display, printer, keypad, keyboard, communication logic, wired and/or wireless, storage device(s) including hard disk drives ("HDD"), solid-state drives ("SSD"), removable storage media, Digital Video Disk (DVD) drive, Compact Disk (CD) drive, Redundant Array of Independent Disks (RAID), tape drive or other storage device. Additionally, there may be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

According to various embodiments, the present disclosure describes a number of examples.

Example 1 may be a processor comprising: a processor core; and filter logic communicatively coupled to the processor core, the filter logic to select a data element from an array of data elements read from a memory communicatively coupled to the processor, in response to a command received from the processor core, the command including a bit vector to identify the data element to be selected and a bit width for the data elements in the array of data elements.

Example 2 may include the processor of Example 1, wherein the filter logic selects the data element from the array of data elements based on the bit width and the bit vector.

Example 3 may include the processor of Example 1, wherein a number of data elements processed per cycle is dependent on the bit width.

Example 4, may include the processor of Example 1, wherein a number of data elements processed per cycle are fully contained within a width of a data path to the filter logic.

Example 5 may include the processor of Example 1, wherein a number of data elements processed per cycle includes partial data elements to process a full width of a data path to the filter logic.

Example 6 may include the processor of Example 1, wherein the array of data elements is an array of unsigned integers in a column of a table of an in-memory database in the memory.

Example 7 may include the processor of Example 1, wherein the command to include a number of bits to skip and a number of bits to extract to identify a plurality of contiguous data elements in the array of data elements to extract.

Example 8 may be method comprising: receiving, by filter logic in a processor, a command from a processor core in the processor, the command including a bit vector to identify a data element in an array of data elements and a bit width for the data elements in the array of data elements; and selecting, by the filter logic, the data element in the array of data elements stored in a memory communicatively coupled to the processor.

Example 9 may include the method of Example 8 further comprising: selecting, by the filter logic, the data element from the array of data elements based on the bit width and the bit vector.

Example 10 may include the method of Example 8 wherein a number of data elements processed per cycle is dependent on the bit width.

Example 11 may include the method of Example 8 wherein a number of data elements processed per cycle are fully contained within a width of a data path to the filter logic.

Example 12 may include the method of Example 8 wherein a number of data elements processed per cycle includes partial data elements.

Example 13 may include the method of Example 8, wherein the array of data elements is an array of unsigned integers in a column of a table of an in-memory database in the memory.

Example 14 may include the method of Example 8 wherein the command to include a number of bits to skip and a number of bits to extract to identify a plurality of contiguous data elements in the array of data elements to extract.

Example 15 may be a system comprising: a memory device to store an in-memory database; and a processor communicatively coupled to the memory device, the processor comprising: a processor core; and filter logic communicatively coupled to the processor core, the filter logic to select a data element from an array of data elements read from the in-memory database in response to a command received from the processor core, the command including a bit vector to identify the data element to be selected and a bit width for the array of data elements in the array of data elements.

Example 16 may include the system of Example 15, wherein the filter logic selects the data element from the array of data elements based on the bit width and the bit vector.

Example 17 may include the system of Example 15, wherein a number of data elements processed per cycle is dependent on the bit width.

Example 18 may include the system of Example 15, wherein a number of data elements processed per cycle are fully contained within a width of a data path to the filter logic.

Example 19 may include the system of Example 15, wherein a number of data elements processed per cycle includes partial data elements to process a full width of a data path to the filter logic.

Example 20 may include the system of Example 15, wherein a number of data elements processed per cycle includes partial data elements to process a full width of a data path to the filter logic.

Example 21 may include the system of Example 15, wherein the array of data elements is an array of unsigned integers in a column of a table of the in-memory database.

Example 22 may include the system of Example 15, wherein the command to include a number of bits to skip and a number of bits to extract to identify a plurality of contiguous data elements in the array of data elements to extract.

What is claimed is:

1. A processor comprising:
   a central processing module including at least one processor core; and
   a hardware accelerator communicatively coupled to the processor core via a system fabric interconnect to offload computation from the processor core, the hardware accelerator to select a data element from an array of data elements read from a column of a table in a column orientated in-memory database stored in a memory communicatively coupled to the processor core, in response to a command received from the processor core, the command including a bit vector to identify the data element to be selected and a bit width from a range of widths for the data elements in the array of data elements, the hardware accelerator to expand the bit vector based on the bit width for the data elements to provide an expanded bit vector and to use the expanded bit vector to select the data element from the array of data elements, a number of data elements processed per cycle are fully contained within less than a full width of a data path to the hardware accelerator.

2. The processor of claim 1, wherein the hardware accelerator selects the data element from the array of data elements based on the bit width and the expanded bit vector.

3. The processor of claim 1, wherein the number of data elements processed per cycle is dependent on the bit width.

4. The processor of claim 3, wherein the number of data elements processed per cycle includes partial data elements in the full width of the data path to the hardware accelerator.

5. The processor of claim 1, wherein the command to include a number of bits to skip and the number of bits to extract to identify a plurality of contiguous data elements in the array of data elements to extract.

6. The processor of claim 1, wherein the bit vector is expanded such that if the data element in the data path to the hardware accelerator has more than one bit, each bit of the bit vector is replicated to match and align with a number of bits in a corresponding data element.

7. The processor of claim 1, wherein the bit width is between 1 and 32 bits.

8. A method comprising:
   receiving, by a hardware accelerator in a processor via a system fabric interconnect, a command from a processor core in the processor to offload computation from the processor core, the command including a bit vector to identify a data element in an array of data elements and a bit width from a range of widths for the data elements in the array of data elements; and
   selecting, by the hardware accelerator, the data element in the array of data elements read from a column of a table in a column orientated in-memory database stored in a memory communicatively coupled to the processor, the hardware accelerator to expand the bit vector based on the bit width for the data elements to provide an expanded bit vector and to use the expanded bit vector to select the data element from the array of data elements, a number of data elements processed per cycle are fully contained within less than a full width of a data path to the hardware accelerator.

9. The method of claim 8, further comprising:
   selecting, by the hardware accelerator, the data element from the array of data elements based on the bit width and the expanded bit vector.

10. The method of claim 8, wherein the number of data elements processed per cycle is dependent on the bit width.

11. The method of claim 10, wherein the number of data elements processed per cycle includes partial data elements in the full width of the data path to the hardware accelerator.

12. The method of claim 8, wherein the command to include a number of bits to skip and the number of bits to extract to identify a plurality of contiguous data elements in the array of data elements to extract.

13. A system comprising:
    a memory device to store a column orientated in-memory database; and
    a processor communicatively coupled to the memory device, the processor comprising:
       a central processing module including at least one processor core; and
       a hardware accelerator communicatively coupled to the processor core via a system fabric interconnect to offload computation from the processor core, the hardware accelerator to select a data element from an array of data elements read from a column of a table in a column orientated in-memory database stored in a memory communicatively coupled to the processor core, in response to a command received from the processor core, the command including a bit vector to identify the data element to be selected and a bit width from a range of widths for the data elements in the array of data elements, the hardware accelerator to expand the bit vector based on the bit width for the data elements to provide an expanded bit vector and to use the expanded bit vector to select the data element from the array of data elements, a number of data elements processed per cycle are fully contained within less than a full width of a data path to the hardware accelerator.

14. The system of claim 13, wherein the hardware accelerator selects the data element from the array of data elements based on the bit width and the expanded bit vector.

15. The system of claim 13, wherein the number of data elements processed per cycle is dependent on the bit width.

16. The system of claim 15, wherein the number of data elements processed per cycle includes partial data elements in the full width of the data path to the hardware accelerator.

17. The system of claim 13, wherein the command to include a number of bits to skip and a number of bits to extract to identify a plurality of contiguous data elements in the array of data elements to extract.

* * * * *